(12) United States Patent
Hemon

(10) Patent No.: US 8,009,744 B2
(45) Date of Patent: Aug. 30, 2011

(54) TWISTED PAIR COMMUNICATION SYSTEM, APPARATUS AND METHOD THEREOF

(75) Inventor: Erwan Hemon, Goyrans (FR)

(73) Assignee: Freescale Semiconductor, Inc., Austin, TX (US)

( * ) Notice: Subject to any disclaimer, the term of this patent is extended or adjusted under 35 U.S.C. 154(b) by 802 days.

(21) Appl. No.: 11/917,888

(22) PCT Filed: Jun. 17, 2005

(86) PCT No.: PCT/EP2005/008262
§ 371 (c)(1),
(2), (4) Date: Dec. 17, 2007

(87) PCT Pub. No.: WO2006/133731
PCT Pub. Date: Dec. 21, 2006

(65) Prior Publication Data
US 2008/0200128 A1 Aug. 21, 2008

(51) Int. Cl.
*H04B 3/00* (2006.01)
(52) U.S. Cl. ........ 375/257; 375/317; 327/108; 327/109; 327/198; 327/50; 327/321; 326/30; 326/82; 326/83; 326/86; 326/87; 361/93.7; 361/93.9; 361/58; 361/87; 361/86
(58) Field of Classification Search ................. 375/317, 375/257; 327/108, 109, 198, 50, 51, 52, 327/53, 54, 55, 56, 57, 58, 321, 379, 545.546, 327/389, 434, 170; 326/30, 82, 83, 86, 87, 326/88, 89, 90; 361/93.7, 93.9, 58, 87, 86, 361/91, 91.2
See application file for complete search history.

(56) References Cited

U.S. PATENT DOCUMENTS

| | | | |
|---|---|---|---|
| 5,194,761 A | 3/1993 | Smith | |
| 6,324,044 B1 | 11/2001 | Teggatz et al. | |
| 6,362,682 B2 * | 3/2002 | Shulman | 327/562 |
| 6,788,116 B1 | 9/2004 | Cook et al. | |
| 7,053,712 B2 * | 5/2006 | Bonaccio et al. | 330/258 |
| 7,292,637 B2 * | 11/2007 | Ho et al. | 375/257 |
| 2001/0045863 A1 * | 11/2001 | Pelly | 327/552 |
| 2002/0070801 A1 | 6/2002 | Ferianz | |
| 2004/0027169 A1 * | 2/2004 | Eberlein | 327/66 |
| 2004/0100838 A1 | 5/2004 | Tamura et al. | |
| 2004/0246026 A1 | 12/2004 | Wang et al. | |
| 2005/0053227 A1 * | 3/2005 | Fortier | 379/390.04 |
| 2006/0160511 A1 * | 7/2006 | Trichy et al. | 455/255 |
| 2006/0218418 A1 * | 9/2006 | Camagna et al. | 713/300 |

FOREIGN PATENT DOCUMENTS

| | | |
|---|---|---|
| EP | 0955750 A2 | 11/1999 |
| EP | 0763917 B1 | 10/2005 |
| EP | 0858195 B1 | 6/2006 |

* cited by examiner

*Primary Examiner* — Chieh M Fan
*Assistant Examiner* — Siu M Lee

(57) ABSTRACT

A communication system comprises a twisted pair communication link operably coupled to at least two driver stages for providing at least two independent input signals on the twisted pair communication link. The at least two independent input signals on the twisted pair communication link are summed and input to a comparator arranged to compare the summed signal to a reference value. The output of the comparator is input to the at least two driver stages. The outputs from the at least two driver stages are summed and fed back and summed with one or more of the independent input signals.

In this manner, adverse effects due to non-ideal symmetry between components in a twisted pair communication link, such as a Controller Area Network system, are reduced.

13 Claims, 2 Drawing Sheets

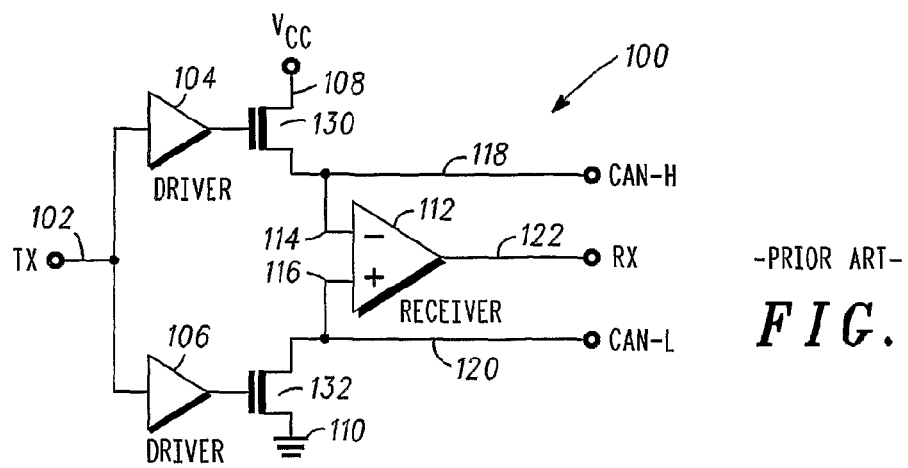
FIG. 1 -PRIOR ART-
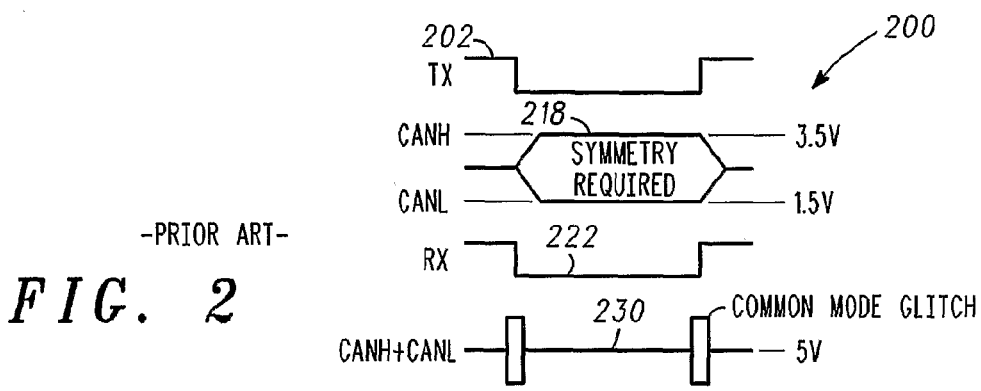
FIG. 2 -PRIOR ART-
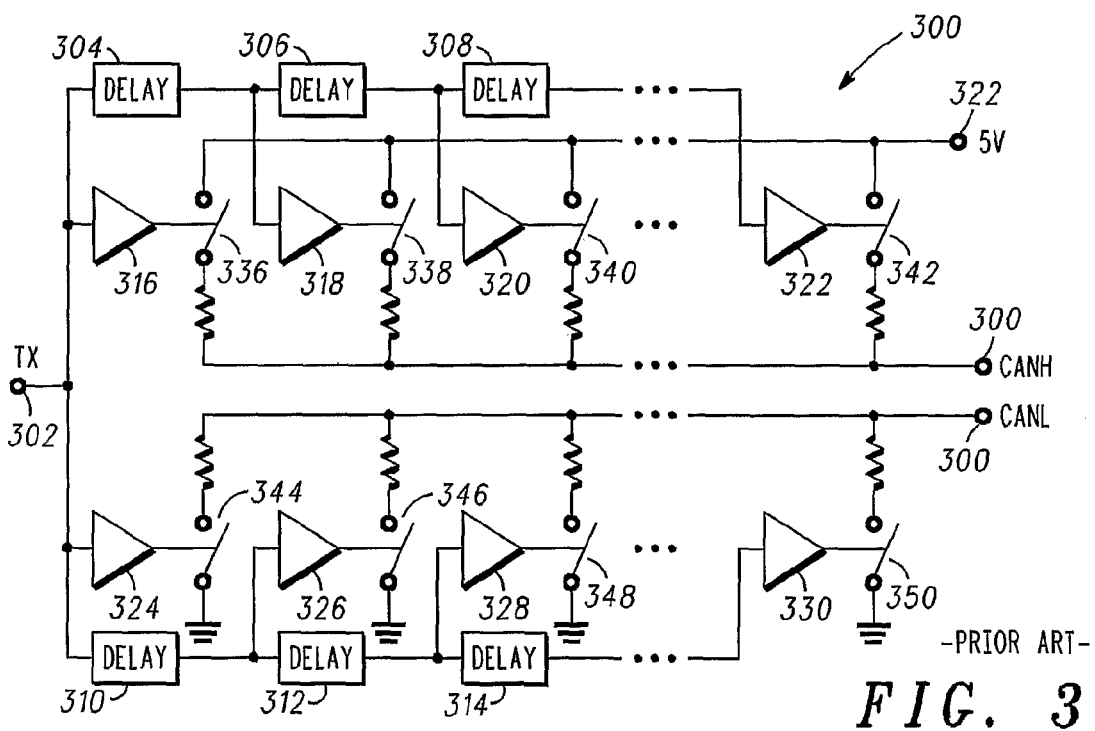
FIG. 3 -PRIOR ART-

TWISTED PAIR COMMUNICATION SYSTEM, APPARATUS AND METHOD THEREOF

FIELD OF THE INVENTION

The preferred embodiment of the present invention relates to reduction of emission level in a twisted pair communication system. The invention is applicable to, but not limited to, provision of a high speed two-wire CAN network.

BACKGROUND OF THE INVENTION

In the field of vehicle electronics, the use of a high speed controller area network (CAN) is becoming ever more prevalent. In a typical automotive application, the CAN provides a two-wire multiplex communication link that can be routed around the vehicle. Thus, the CAN provides a simple mechanism for a vehicle processing unit to communicate effectively with remote electrical/signal processing units, e.g. vehicle light modules, braking system, airbag modules, etc.

The CAN specifications for road vehicles are defined by the International Standards Organisation (ISO), as described below.
 (i) ISO 11898-2: high speed physical layer—part 2;
 (ii) ISO 11898-3: low speed fault tolerant physical layer— part 3;
 (iii) ISO 11898-4: time trigger CAN; and
 (iv) ISO 11898-5: high speed physical layer with low power mode and wake up.

The CAN specifications support communication over, say, a ten metre length. However, in requiring the CAN bus to support communication over this length, the long wires act as an antenna and as such are effectively subject to automotive electrical transients, as well as industrial transients, such as electro-magnetic interference (EMI) and electro-static discharge (ESD).

Furthermore, as the wires can be very long, the control of the slew rate of signals routed by the wires is also known to be very critical to avoid any EMC emission. In addition, in order to operate the CAN bus successfully, in a problematic vehicle environment; a CAN transceiver must also be able to withstand high voltage transients.

Consequently, it is important to guarantee a good control and matching of the respective devices between the switching of the two CAN wires. To guarantee good matching of the slew rate between the respective wires, the two wires (i.e. the high-side CAN (CAN-H) and the low-side CAN (CAN-L)) must be matched in performance and controlled equally.

A typical CAN driver circuit is illustrated in FIG. 1. The CAN driver circuit comprises a digital transmit input signal 102 that is input to both the CAN-H driver 104 and a CAN-L driver 106. In order to achieve both high-speed and symmetry of operation, low-voltage matched components are generally used. The CAN-H driver utilizes, say, a pnp transistor 130 as an active device operably coupled to Vcc 108, where as the CAN-L driver utilizes, say, a npn transistor 132 as an active device, operably coupled to ground 110.

The respective outputs 118, 120 from the CAN-H and CAN-L drivers 104, 106 are input 114, 116 to a comparator 112. The output from the comparator 112 is a 'receive' digital output signal 122. Thus, as will be appreciated by a skilled artisan, the driver circuits that control the signals on the CAN-H wire 118 and CAN-L wire 120 need to be carefully matched, to ensure that the CAN-H driver 104 and CAN-L driver 106 are adjusted to switch between the CAN-H and CAN-L wires 118, 120 in phase. A key aspect to using such a twisted cable is to ensure the current contained in the wires (in both directions) is of equal amplitude and of opposite sign. In this manner, the magnetic field produced, which is proportional to the current, is substantially zero. Thus, electro-magnetic interference due to the current in the twisted pair of cables is minimized. Clearly, any asymmetry between the current in the two wires produces a magnetic field, which is highly undesirable.

In addition, it is known that the common-mode CAN-H bus wire and CAN-L bus wire must also be constant during the switching transition, i.e. when a signal appears on the CAN-H and CAN-L wires, and when it is taken off. Thus, the ΔI needs to be minimized during the transitions otherwise electromagnetic interference is created. In effect, there are two types of common-mode configuration:
 (i) Current: where the current value of both the CAN-H and CAN-L wires should be equal but of opposite sign; and
 (ii) Voltage: which should be equal, given that the for high speed operation the bus impedance is specified as 60 ohms in the CAN standard.

Furthermore, to avoid EMC emission, the slew rate applied to signals on the CAN-H bus wire 118 and the CAN-L bus wire 120 must be controlled and matched. The slew rate is a function of the temperature (delay) and of the load. Consequently, the slew rate is difficult to control accurately.

A graphical example of how difficult it is to achieve a good match between the high-side driver and the low-side driver is shown in FIG. 2. Here, the transmit waveform signal 202 is shown with a slight offset to the receive waveform signal 222. If the respective driver circuits are symmetrical, the CAN-H and CAN-L signals in waveform 218 are also symmetrical, resulting in the summation of CAN-H (nominally 3.5V) and CAN-L (nominally 1.5V) values to be flat, at approximately 5V. The summation of the CAN-H and CAN-L signals is often referred to as the 'common mode'. However, when the driver circuits are not completely matched, the symmetry between CAN-H and CAN-L during transitions is not met. This lack of matching results in a so-called common-mode glitch 230 (say a variation of the order of 120 mV), which is noticeable upon the summation of the CAN-H and CAN-L values.

A solution to this problem is illustrated in the known prior art circuit 300 of FIG. 3, with the use of multiple drivers 316, 318, 320, 322 for the CAN-H and drivers 324, 326, 328 and 330 for CAN-L. A series of very fast switches 336, 338, 340, 342, 344, 346, 348 and 350 are operably coupled to respective serial resistances, where each driver operation is controlled by a fixed delay 304, 306, 308, 310, 312 and 314.

In this regard, the slew rate is fixed by the delay elements 304, 306, 308, 310, 312 and 314, the series resistances and the load capacitance. Accurate selection of these components ensures a good match.

However, with a high voltage range on the output, non symmetrical clamping is (due to the inherent nature of the components) introduced in series with resistance. These high voltage components can be designed to be somewhat symmetrical at low frequencies. However, they will exhibit asymmetry at higher frequencies, say above 100 KHz. Thus, asymmetry of signals between the two wires will generate common-mode glitches at a frequency of above 100 KHz. In effect, a new common-mode (i.e. the summation of the values of the CAN-H and CAN-L wires) exists at each frequency of operation.

European Patent EP 0955750, titled "Line driver with parallel driver stages" by Texas Instruments, as well as European Patent EP0763917 titled "Line driver with pulse shaper" by Lucent Technologies Inc. U.S. Pat. No. 5,194,761 illustrates prior art CAN arrangements.

However, it is recognised that, in order to sustain higher and higher voltage levels during fault conditions, it is no longer possible to use low voltage components. Thus, instead, high voltage components are required to be used, particularly components that exhibit higher parasitic effects. Notably, and problematically, the parasitic components exhibit different characteristics for the high side driver (CAN-H) and the low side driver (CAN-L) outputs. Consequently, the common-mode performance becomes degraded with those high voltage components.

Thus, a need exists for an improved twisted-pair based communication system, apparatus and method therefor, particularly to drive CAN-H and CAN-L bus wires.

STATEMENT OF INVENTION

In accordance with preferred aspects of the present invention, there is provided a communication system, an apparatus and method therefor to reduce emission levels due to non-ideal symmetry between components in twisted pair paths, as defined in the appended Claims.

BRIEF DESCRIPTION OF THE DRAWINGS

FIG. 1 illustrates a known CAN driver circuit;

FIG. 2 shows a graphical example illustrating the difficulty in achieving a good match between a CAN-H driver and a CAN-L driver is a CAN bus system; and FIG. 3 illustrates a known multiple CAN driver circuit that aims to provide a good match between a CAN-H driver and a CAN-L driver.

Figure 4:
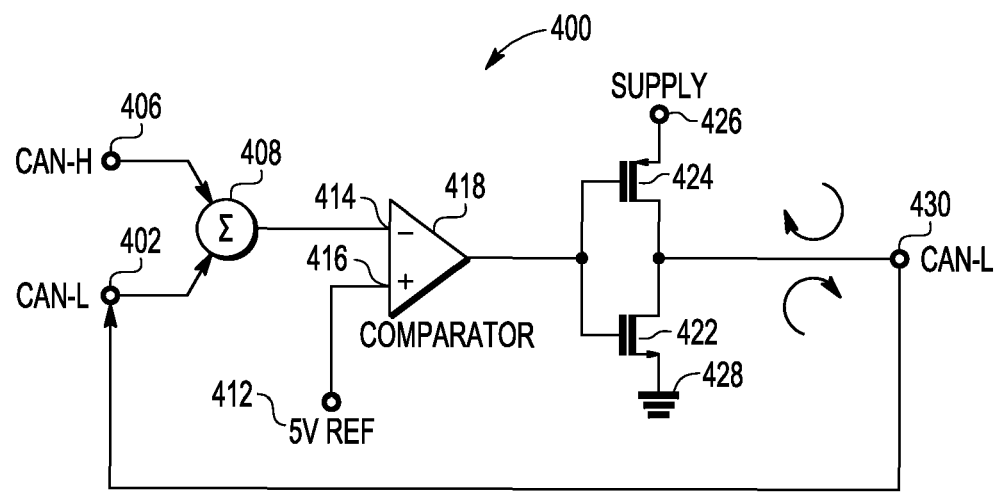
Figure 5:
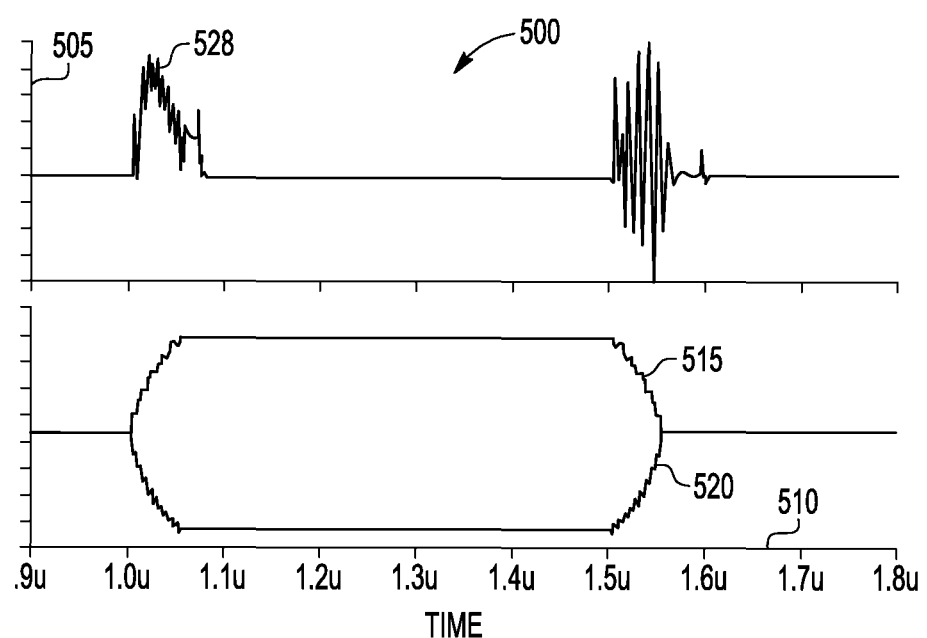

Exemplary embodiments of the present invention will now be described, by way of example only, with reference to the accompanying drawings, in which:

FIG. 4 illustrates a CAN driver circuit in accordance with the preferred embodiment of the present invention; and FIG. 5 illustrates graphically how the circuit of FIG. 4 provides a reduction in the common-mode error in accordance with the preferred embodiment of the present invention.

DESCRIPTION OF PREFERRED EMBODIMENTS

Referring now to FIG. 4, a CAN driver circuit is illustrated in accordance with the preferred embodiment of the present invention. Notably, the CAN-H signal 406 and the CAN-L signal 402 are input to a summation function 408. It is envisaged that the summation function may be implemented in a variety of ways, such as a summing block, discrete logic gates, AC coupling capacitors, etc. The CAN-H signal 406 and the CAN-L signal 402 are thus summed and input 414 to a fast comparator 418 at, say, a negative input port 414.

A reference voltage level 412 is applied to the positive input port 416 of the comparator. The comparator 418 compares the summation of CAN-H and CAN-L signals with a reference voltage 412, which in the preferred embodiment is set at 5V. The comparator 418 outputs the comparison to both a CAN-H driver stage 424 and a CAN-L driver stage pair 422, 424. The CAN-H driver stage 424 is coupled to a supply voltage 426 and the CAN-L driver stage 422 is coupled to ground 428.

Although the preferred embodiment of the present invention is described with respect to using NMOS and PMOS transistors 422, 424 at the output of the comparator 418 to generate a CAN-L feedback signal, it is envisaged that these devices may be replaced by equivalent functions, such as switches or current sources or current sources with resistors coupled thereto, etc.

Notably, the output from both the CAN-H driver stage 424 and the CAN-L driver stage 422 is summed and provided as a feedback signal to either the CAN-H or CAN-L (or indeed both) signal(s). In comparing the summation of 'CAN-H+CAN-L' to a reference voltage applied to the comparator, the output of the comparator flips as soon as the summation goes above or below the reference value. Thus, dependent upon the comparison of the common-mode (summation of CAN-H and CAN-L, nominally 5V) value to the reference value (of 5V), current is either drawn from the CAN-L or pushed into the CAN-L feedback path to compensate for the difference. In this manner, the value of 'CAN-H+CAN-L' is either decreased or increased via the feedback path.

The speed of the comparator defines the reaction time of this loop, and thus the difference between the summation of 'CAN-H+CAN-L' and the reference voltage.

Thus, in this manner, a mechanism to improve the performance of the CAN circuit 400 is described by summing the CAN-H signal 406 and CAN-L signal 402 and using a fast, continuously-operating comparator 418, e.g. one that provides sufficient speed and low offset between the two wires. Thereafter, the output from the comparator 418 is fed back to one or both of the CAN signals 406, 402. A typical (CMOS) comparator error of 10 mV will result in a common-mode glitch of 10 mV.

Furthermore, in this implementation, the current compensation is limited to, say, 10% of the total current, to avoid an adverse affect on the performance (e.g. slew rate, propagation time, etc.) when the compensation system is disturbed by EMC perturbation (BCI, DPI, etc.).

In a CAN system, the transition rise time and fall time of the CAN-H and CAN-L signals has to be typically between 15 nsec and 35 nsec at a speed of 1M baud. Thus, it is envisaged that if the two CAN wires cannot be accurately matched using a single driver stage, a series of respective driver stages may be used, where the series of small stages are located in parallel, as per the known system in FIG. 3.

In this regard, several stages may be sequentially triggered in parallel. For example, if 10 stages are located in series, for each of the parallel CAN-H and CAN-L paths, the comparator may need to switch between the stages every 1.5 nsec to 3.5 nsec per transition. Hence, in this regard, a switching performance of the comparator of between 1 nsec and 5 nsec is likely to be acceptable.

Although, the preferred embodiment of the present invention is described with reference to a continuously-operating comparator, it is envisaged that the inventive concept is equally applicable to a 'time-discrete' comparator, as would be understood by a skilled artisan. In this context, a 'time-discrete' comparator would encompass a 'sample & hold' type of comparator, whereby values of the CAN-H and CAN-L signals are sampled and held and then compared in a time-discrete manner. Advantageously, a number of 'sample & hold' comparators offer an offset-cancellation technique. The use of an offset-cancellation technique allows the removal of any common-mode glitch that occurs due to the comparator offset.

It is also envisaged that known cancellation techniques may be applied to continuously-operating comparators such that they also can implement cancellations of common-mode glitches due to a comparator offset.

In an enhanced embodiment of the present invention, it is envisaged that the common-mode glitch problem is only applied during transition stages of the CAN system. In this regard, it is envisaged that the feedback circuitry is enabled at the start of a transition and disables after the transition has ended. Advantageously, employing such a time-multiplexed arrangement assists in minimising disturbances in the CAN system caused by the aforementioned circuitry.

The use of a fast comparator in this manner compensates for any real-time imbalance between the signal values on the CAN-H and CAN-L wires, thereby facilitating a dramatic reduction in emission level by limiting the common-mode glitch that occurs during transition on the bus lines.

Advantageously, the current output capability of the CAN compensation circuit is limited to a certain (low) value, in contrast to the main CAN-L and CAN-H capabilities. Indeed the slew rate on (CAN-H or CAN-L) is directly proportional to the output current. Thus, by using a series of smaller MOSFETs, any variation of current in, say, the CAN-L line causes minimal modification to the slew rate. Consequently, it is an advantage to limit the current transition, particularly in vehicular applications, to minimise the effect of radiated emissions due to, say, mobile antenna(s) or portable TVs.

At each stage transition, the comparator 418 thus compensates the intrinsic error of common-mode 'CAN-H+CAN-L' by continuously adding or subtracting current 430 in order to keep a common-mode value substantially equal to the reference value 412. By ensuring that the summation value of 'CAN-H+CAN-L' is made substantially equal to a predefined reference value, any electromagnetic emission resulting from using a twisted pair of wires (as per the CAN system) is effectively reduced, i.e. the magnetic fields generated by each wire are opposed in sign and therefore the resultant value of the summation is substantially 'zero'.

Referring now to FIG. 5, a graph illustrates how the circuit of FIG. 4 provides a reduction in the common-mode error in accordance with the preferred embodiment of the present invention. FIG. 5 illustrates a transition between CAN-H and CAN-L signals, and in particular the correction current that maintains a low glitch level.

Although the preferred embodiment of the present invention has been described with reference to a CAN circuit, it is envisaged that, for alternative applications, the inventive concept may be applied to any communication system that employs twisted pair cabling, such as those used by Ethernet transceivers.

It will be understood that the communication system, apparatus and method for reducing emission levels in a two-wire communication system, such as a CAN system as described above, aims to provide at least one or more of the following advantages:

(i) Improve the non-ideal symmetry on CAN-H, CAN-L drivers;
(ii) Reduce the reliance on matched components within the device used between the two wires;
(iii) The common-mode glitch problem associated with bus transitions is better controlled;
(iv) The preferred embodiment is very robust to process variations, due to the introduction of the feedback loop;
(v) The EMC emission is dramatically reduced; and
(vi) The circuit of the preferred embodiment is such that it is very easy to reuse on other applications/technologies; i.e. substantially no software/hardware modifications are required.

In particular, it is envisaged that the aforementioned inventive concept can be applied by a semiconductor manufacturer to any device or integrated circuit for use in any communication system employing twisted cabling. It is further envisaged that, for example, a semiconductor manufacturer may employ the inventive concept in a design of a stand-alone device, such as an Ethernet transceiver, or an embedded module in an application-specific integrated circuit (ASIC) and/or any other sub-system element.

Whilst the specific and preferred implementations of the embodiments of the present invention are described above, it is clear that one skilled in the art could readily apply variations and modifications of such an inventive concept.

Thus, an improved twisted pair communication system, apparatus and method therefor; to reduce emission levels due to non-ideal symmetry between components in the respective twisted pair paths have been described, wherein the aforementioned disadvantages with prior art arrangements have been substantially alleviated.

The invention claimed is:

1. A communication system comprising:
a twisted pair communication link operably coupled to at least two driver stages for providing at least two independent input signals on the twisted pair communication link, wherein the at least two independent input signals on the twisted pair communication link are summed and input to a comparator arranged to compare the summed signal to a constant reference value, wherein an output of the comparator is input to the at least two driver stages and outputs from the at least two driver stages are summed together, fed back, and summed with one or more of the at least two independent input signals.

2. A communication system according to claim 1 wherein the communication system supports a Controller Area Network communication.

3. A communication system according to claim 1 wherein the comparator and the at least two driver stages are arranged to compensate for common-mode error by adding or subtracting current to be summed with the one or more of the independent input signals to substantially track the reference value.

4. A communication system according to claim 1, wherein the comparator is fast continuously-operating comparator or a 'time-discrete' comparator.

5. A communication system according to claim 1, wherein the communication system encompasses a plurality of output stages of the twisted pair communication link arranged in parallel to produce one of a CAN-H output and/or one CAN-L output.

6. A communication system according to claim 5 wherein the plurality of stages are turned on in sequence.

7. Apparatus for a communication circuit comprising:
a twisted pair communication link operably coupled to at least two driver stages for providing at least two independent input signals on the twisted pair communication link, wherein the at least two independent signals on the twisted pair communication link are summed and input to a comparator that compares the summed signal to a constant reference value, wherein an output of the comparator is input to the at least two driver stages and outputs from the at least two driver stages are summed, fed back, and summed with one or more of the at least two independent input signals.

8. Apparatus for a communication circuit according to claim 7 wherein the apparatus supports Controller Area Network (CAN) communication.

9. Apparatus according to claim 7 wherein the comparator and the at least two driver stages are arranged to compensate for common-mode error by adding or subtracting current to be summed with the one or more of the independent input signals to substantially track the reference value.

10. Apparatus according to claim 7 wherein the comparator is fast continuously-operating comparator or a 'time-discrete' comparator.

11. Apparatus according to claim 7 wherein the communication system encompasses a plurality of output stages of the twisted pair communication link arranged in parallel to produce one of a CAN-H output and/or one CAN-L output.

12. Apparatus according to claim 11 wherein the plurality of stages are turned on in sequence.

13. A method of reducing common-mode error in a communication system comprising a twisted pair communication link comprising the steps of:

provinding at least two independent input signals on the twisted pair communication link;

summing the at least two independent input signals on the twisted pair communication link;

comparing at a comparator the summed signal to a constant reference value;

inputting an output of the comparator to at least two driver stages;

summing the outputs from the at least two driver stages;

feeding back the summed output from the at least two driver stages to one or more of the at least two independent input signals; and summing the feedback summed output with the one or more of the at least two independent input signals.

\* \* \* \* \*